United States Patent
Matsuda et al.

(10) Patent No.: US 6,906,139 B2
(45) Date of Patent: Jun. 14, 2005

(54) THERMOPLASTIC RESIN COMPOSITION, MOLDING MADE OF THE THERMOPLASTIC RESIN COMPOSITION AND PROCESS OF MANUFACTURING THE MOLDING

(75) Inventors: Yushi Matsuda, Hiroshima (JP); Masao Hara, Hiroshima (JP); Kenichi Yamamoto, Hiroshima (JP); Yuki Kooda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 305 days.

(21) Appl. No.: 10/255,094

(22) Filed: Sep. 26, 2002

(65) Prior Publication Data

US 2004/0162393 A1 Aug. 19, 2004

(30) Foreign Application Priority Data

Sep. 28, 2001 (JP) ........................................ 2001-302996

(51) Int. Cl.$^7$ .............................. C08F 8/00; C08L 9/00; C08L 23/00; C08L 23/04; C08L 25/02
(52) U.S. Cl. ........................ 525/191; 525/232; 525/240; 525/241
(58) Field of Search ................................ 525/191, 232, 525/240, 241

(56) References Cited

U.S. PATENT DOCUMENTS

| | | | |
|---|---|---|---|
| 4,508,870 A | | 4/1985 | Dufour et al. |
| 4,628,073 A | * | 12/1986 | Fisher .......................... 525/70 |
| 4,829,125 A | * | 5/1989 | Yeo et al. .................... 525/194 |
| 5,162,422 A | | 11/1992 | Lausberg et al. |
| 6,037,418 A | * | 3/2000 | Mukai et al. ................ 525/242 |

FOREIGN PATENT DOCUMENTS

| | | |
|---|---|---|
| EP | 0 249 251 A1 | 12/1987 |
| EP | 0 504 556 A3 | 9/1992 |
| JP | 2000-336239 A | 12/2000 |

* cited by examiner

*Primary Examiner*—Nathan M. Nutter
(74) *Attorney, Agent, or Firm*—Nixon Peabody LLP; Donald R. Studebaker

(57) ABSTRACT

A molding made of a thermoplastic resin composition that comprises a thermoplastic resin component and an elastomer component partly blending in with each other is continuously heated at a temperature higher than 120° C. but lower than a melting point of each of the two components for at least one hour so as thereby to cause the thermoplastic resin component to separate and precipitate in the elastomer component.

16 Claims, 5 Drawing Sheets

THERMOPLASTIC RESIN COMPOSITION, MOLDING MADE OF THE THERMOPLASTIC RESIN COMPOSITION AND PROCESS OF MANUFACTURING THE MOLDING

BACKGROUND OF THE INVENTION

1. Field of the Invention

The present invention relates to a thermoplastic resin composition, a molding made of the thermoplastic resin composition and a process of making the molding.

2. Description of Related Art

In the recent years, as having been known in, for example, the field of automobile vehicles, there is a strong demand on resin moldings such as used for interior parts of a passenger compartment for higher impact absorption in order to enhance passenger protection function upon an occurrence of a collision. Thermoplastic resins such as polypropylene have been known as the high impact absorptive material suitable for the interior parts.

In order to enhance the impact absorption of such a thermoplastic resin molding, various kind of things have been done to meliorate thermoplastic resin compositions for an increase in the property of elongation thereof. For example, it has been attempted to disperse an elastomer component such as a rubber component in a resin matrix such as a polypropylene resin so that the elastomer component causes deformation due to an impact load. A thermoplastic resin molding made of the thermoplastic resin composition provides an improvement in the property of elongation, in particular the property of high speed elongation at a loading speed of higher than 2 m/sec., of the thermoplastic resin molding.

As just described above, although the property of elongation of a thermoplastic resin molding can be meliorated to a certain extent by dispersing an elastomer component in a matrix resin for the thermoplastic resin molding, what can not be overlooked is the problem that a thermoplastic resin molding demonstrates a tendency to toward a decline in the coefficient of elasticity, in particular a decline in the flexural coefficient of elasticity, in the case of trying to increase the elastomer content of the thermoplastic resin composition in order to realize a more enhanced property of elongation of the thermoplastic resin molding. Although an enhancement of the property of elongation of the thermoplastic resin molding could conceivably include a change in the type of elastomer of the thermoplastic resin composition, however, when the elastomer is of an unusual type, the elastomer itself is too expensive to be employed for the thermoplastic resin composition and turns out to be little practical.

In the way of ensuring an enhancement of the property of elongation of a thermoplastic resin molding by melioration of the thermoplastic resin composition, in the event where, even though a trial molding works out satisfactorily, there occurs the necessity of changing the composition of the thermoplastic resin material for the molding for some reasons in subsequent events, the thermoplastic resin material generally changes its solid state properties such as a coefficient of contraction resulting from the change in composition. This causes the necessity of modifying the molding die or fabricating an alternative molding die which drives up a molding cost.

SUMMARY OF THE INVENTION

It is therefore an object of the present invention to provide a thermoplastic resin composition of a desired flexural coefficient of elasticity for a molding that is meliorated in the property of elongation and manufactured at a low cost.

It is another object of the present invention to provide a process of manufacturing a molding meliorated in the property of elongation from a thermoplastic resin composition of a coefficient of elasticity desirable for the molding at a low cost using.

According to an aspect of the present invention, the foregoing objects of the present invention are accomplished by a thermoplastic resin composition that comprises at least a thermoplastic resin component such as preferably a polypropylene resin and an elastomer component such as preferably a styrene elastomer and has a micro-structure in which the thermoplastic resin component precipitates in the elastomer component.

Resulting from that the thermoplastic resin composition yields the micro structures, when the thermoplastic resin component precipitating in the elastomer component receives a stress above a certain stress intensity, the thermoplastic resin component shows a decline in strength due to an appearance of a number of fine clacks. In consequence, the elastomer component brings its deformation ability into full play owing to the stress. This provides a greater melioration in the property of elongation of the thermoplastic resin composition.

In a telescopic examination of the thermoplastic resin composition dyed with a ruthenium tetroxide solution with a transmission electron microscope, the thermoplastic resin composition shows a "sea-island-lake" micro-structure which comprises a "sea" region consisting of a matrix resin, an "island" region appearing in the "sea" region and a "lake" region appearing in the "island" region and in which the "sea" region and the "lake" region are desirably substantially identical in contrast. Further, in an analysis with an electron energy loss spectroscopy, the "sea" region and the "lake" region emit spectra representing bonded states of carbon, respectively, that are desirably substantially identical in configuration.

These facts that the thermoplastic resin composition is telescopically examined as yielding the "sea-island-lake" micro-structure that contains the thermoplastic resin component as the "sea" region precipitating in the "island" region consisting of the elastomer component demonstrate greater melioration in the property of elongation of the thermoplastic resin composition.

According to another aspect of the present invention, the foregoing objects of the present invention are accomplished by a molding made of the thermoplastic resin composition, especially made of the thermoplastic resin composition yielding the "sea-island-lake" micro-structure, as described above. This thermoplastic resin molding, in particular a polypropylene resin molding that has high versatility, demonstrates more greater melioration in the property of elongation.

According to still another aspect of the present invention, the foregoing objects of the present invention are accomplished by a process of manufacturing a molding from the thermoplastic resin composition that includes at least the step of continuously heating the thermoplastic resin molding at a heating temperature above approximately 120° C. but below a melting temperature of each of the thermoplastic resin component and the elastomer component for at least one hour so as thereby to cause the thermoplastic resin composition to separate and precipitate in the elastomer composition.

If the heating temperature exceeds the lower limit of 120° C., it is hard for the thermal treatment to cause the thermoplastic resin component to separate and precipitate in the elastomer component. On the other hand, if the heating temperature exceeds the upper limit, i.e. a melting temperature of each of the respective components, it is hard for the thermal treatment to cause the separation and precipitation of the thermoplastic resin component in the elastomer component without causing the respective components to melt. Further, if the heating time is less than one hour, it is hard for the thermal treatment to exert sufficient effect on the thermoplastic resin molding. In order for the thermoplastic resin molding to enjoy the sufficient effects of thermal treatment, the thermal treatment is more desirably performed at a heating temperature higher than 140° C. for more than two hours but less than 8 hours in view of preventing oxidation and/or decomposition of the thermoplastic resin composition.

The thermoplastic resin composition may further comprise an additive component incompatible with the thermoplastic resin component and compatible with the elastomer component. The thermoplastic resin composition containing such an additive component is effective in yielding large representation of the "sea-island-lake" micro-structures. In consequence, the thermoplastic resin molding demonstrates more greater melioration in the property of elongation. In this instance, the thermoplastic resin molding does not alter in its own composition, the additive component has basically no effect on the thermal treatment and, of course, on the coefficient of elasticity of the thermoplastic resin molding.

The thermoplastic resin component, the elastomer component and the additive component desirably comprise a polypropylene resin, a styrene elastomer and a polystyrene resin, respectively each of which is widely available commercially and inexpensively. In addition, the thermoplastic resin molding made of a matrix of a polypropylene resin that has high versatility yields more reliable melioration in the property of elongation.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

The term "sea-island-lake" "micro-structure" as used herein shall mean and refer to a micro-structure which comprises a "sea" region consisting of a matrix resin component, an "island" region consisting of an elastomer component in which the matrix resin component precipitates and a "lake" region consisting of an additive component encompassed with the elastomer component.

The inventors of this application have revealed through their research and development on thermoplastic resin compositions that a micro-structure excellent in the property of energy absorption, in other words the property of elongation, can be yielded in the thermoplastic resin composition by admixing a certain type of additive component such as a polystyrene resin in a thermoplastic resin matrix such as a polypropylene (PP) resin with an elastomer component dispersed therein. That is, a thermoplastic resin can be uplifted in the property of elongation by forming such the "sea-island-lake" micro-structure in which the matrix resin component precipitates in an elastomer component so as to encompass an additive component with the elastomer component.

Figure 1A:
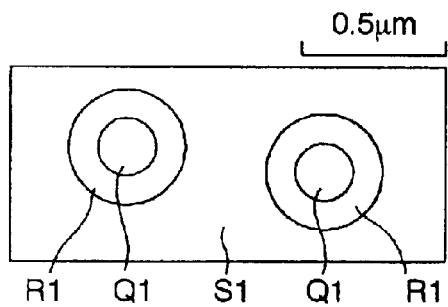
FIG. 1A is a schematic illustration showing a "sea-island-lake" micro-structure of a thermoplastic resin composition.

FIG. 1A schematically shows a "sea-island-lake" micro-structure of a thermoplastic resin composition. In FIG. 1A, "sea", "island" and "lake" regions are indicated by reference characters S1, R1 and Q1, respectively.

As a result of the evolving researches, the inventors of this application found the fact that a thermoplastic resin was capable of being uplifted more in the property of elongation through an increase in the number of "sea-island-lake" micro-structures in the thermoplastic resin by means of employing a polypropylene resin of high rubber copolymerization ratio as a base material. Microscopic examination brought out that the uplifted more in the property of elongation resulted from the additional formation of "sea-island-lake" micro-structures with copolymer rubber at their centers.

Figure 1B:
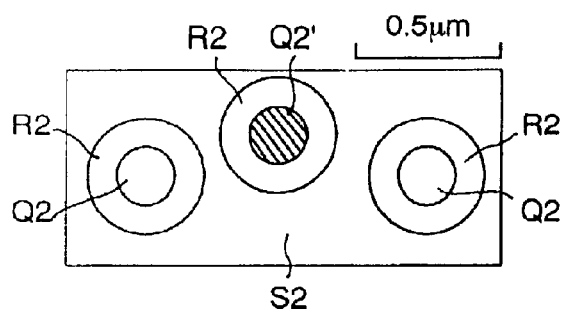
FIG. 1B is a schematic illustration showing a "sea-island-lake" micro-structure of a polypropylene resin of high rubber copolymerization ratio.

FIG. 1B schematically shows a "sea-island-lake" micro-structure of a polypropylene resin of high rubber copolymerization ratio as a base material. In FIG. 1B, "sea", "island" and "lake" regions are indicated by reference characters S2, R2 and Q2, respectively. Another "lake" region that consists of copolymer rubber is indicated by a reference character Q2'.

As perceived from the comparison of the "sea-island-lake" micro-structure shown in FIG. 1B with that shown in FIG. 1A, there is the additional formation of "sea-island-lake" micro-structures with copolymer rubber at their centers.

In the process of trying to meliorate the property of elongation of thermoplastic resins made of base polypropylene resins containing additional formation of "sea-island-lake" micro-structures with copolymer rubber at their centers, the inventors of the present application found that moldings made of such the thermoplastic resin was meliorated in the property of elongation and, in consequence, in the property of impact absorption. Specifically, in the case of employing a polypropylene resin as a resin matrix that had a high rubber copolimerization ratio and was at least compatible with a rubber component, it was found that the rubber component existed in such a state that the polypropylene component blended in with the rubber component during dispersion and that this blend of these components inhibited deformation of the rubber component resulting from a stress acting thereon, so as thereby to put a restraint on the property of elongation of the thermoplastic resin molding. In addition, it was also found that a thermal treatment of the thermoplastic resin molding under a specific condition brought about enhanced melioration in the property of elongation resulting from separation of the polypropylene resin component from the rubber component. This is conceivably brought about resulting from a significant strength reduction of the polypropylene resin component in the rubber component that is caused due to an occurrence of a number of fine cracks resulting from a stress of higher than a certain intensity acting thereon. When the polypropylene resin component in the rubber component causes a strength reduction due to an occurrence of fine cracks, the rubber component can fulfill its primary deformable feature in response to a stress acting thereon. Accordingly, the polypropylene resin is conceivably contributory to melioration of the properties of elongation of polypropylene resin moldings. In this instance, the molding itself does not in any way alter in composition, so as to have basically little effect on its coefficient of elasticity.

Figure 1C:
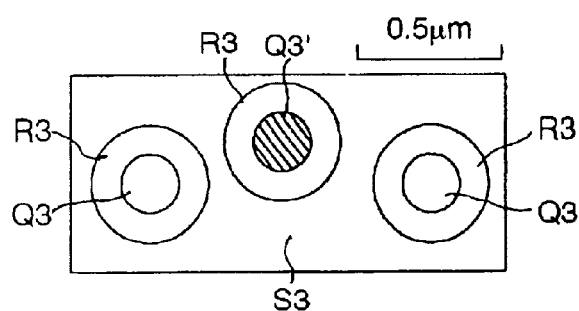
FIG. 1C is a schematic illustration showing a "sea-island-lake" micro-structure in which a polypropylene resin component separates into a rubber component.

FIG. 1C schematically shows a "sea-island-lake" microstructure of a polypropylene resin as a resin matrix which contains polypropylene resin component separating into the rubber component. In FIG. 1C, "sea", "island" and "lake" regions are indicated by reference characters S3, R3 and Q3, respectively. Another "lake" region that consists of copolymer rubber of the matrix polypropylene resin is indicated by a reference character Q3' and has the matrix polypropylene resin component separated into the rubber component.

One example of thermal treatments that is applicable to a thermoplastic resin is to heat a thermosetting resin such as an RMI urethane resin so as to induce a complete reaction for what is called post curing. Otherwise, as disclosed in Japanese Unexamined Patent Publication No. 2000-336239, it has been known to heat a thermoplastic olefin rubber so as to facilitate a dynamic crosslinking reaction. However, these thermal treatments are practiced for facilitation of reaction and, therefore, different radically in terms of the technical concept, the motive for and effect of application and the type of treatment from thermal treatments that are applied to resin products after the completion of reaction and molding. The inventors of this application have found that a trace of the thermal treatment applied to a thermoplastic resin molding can be easily born out from a particular result that is obtained by analyzing the thermoplastic resin molding with a specific analytical method.

The following description will be directed to the result of examinations of the flexural coefficient of elasticity and the property of high speed elongation of thermoplastic resin moldings made of various thermoplastic resin compositions after a thermal treatment applied under different conditions. The thermoplastic resin compositions includes a two-component thermoplastic resin principally consisting of two components, namely a thermoplastic resin matrix (A) such as a polypropylene resin and an elastomer component (B) and a three-component thermoplastic resin principally consisting of three components, namely a thermoplastic resin matrix (A) such as a polypropylene resin, an elastomer component (B) and an additive component (C). The table I shows details of the examination of the respective thermoplastic resin compositions—composition, compounding ratio, condition on the thermal treatment and result of the thermal treatment.

TABLE I

| | PP resin | | Elastomer | | Filler | | Additive | | Thermal treatment | | Coefficient of elongation | High speed elongation | |
|---|---|---|---|---|---|---|---|---|---|---|---|---|---|
| | type | w % | type | w % | | w % | | w % | ° C. | H | Gpa | HSP(%) | Note |
| CRI | I | 50 | I | 20 | w/ | 20 | w/ | 10 | ☐ | ☐ | 0.86 | 303 | |
| CRII | I | 50 | I | 20 | w/ | 20 | w/ | 10 | 120 | 0.5 | 0.86 | 303 | |
| SRI | I | 50 | I | 20 | w/ | 20 | w/ | 10 | 120 | 1.0 | 0.86 | 310 | |
| SRII | I | 50 | I | 20 | w/ | 20 | w/ | 10 | 120 | 2.0 | 0.86 | 310 | |
| SRIII | I | 50 | I | 20 | w/ | 20 | w/ | 10 | 120 | 3.0 | 0.86 | 313 | |
| SRIV | I | 50 | I | 20 | w/ | 20 | w/ | 10 | 140 | 0.5 | 0.86 | 312 | |
| SRV | I | 50 | I | 20 | w/ | 20 | w/ | 10 | 140 | 1.0 | 0.86 | 330 | |
| SRVI | I | 50 | I | 20 | w/ | 20 | w/ | 10 | 140 | 2.0 | 0.86 | 330 | |
| SRVII | I | 50 | I | 20 | w/ | 20 | w/ | 10 | 140 | 3.0 | 0.86 | 335 | |
| SRVIII | I | 50 | I | 20 | w/ | 20 | w/ | 10 | 160 | 0.5 | 0.86 | 335 | |
| SRIX | I | 50 | I | 20 | w/ | 20 | w/ | 10 | 160 | 1.0 | 0.86 | 350 | |
| SRX | I | 50 | I | 20 | w/ | 20 | w/ | 10 | 160 | 2.0 | 0.86 | 350 | |
| SRXI | I | 50 | I | 20 | w/ | 20 | w/ | 10 | 160 | 3.0 | 0.86 | 350 | |
| CRIII | II | 80 | II | 20 | w/o | 0 | w/o | 0 | ☐ | ☐ | 1.13 | 19 | |
| SRVII | II | 80 | II | 20 | w/o | 0 | w/o | 0 | 140 | 2.0 | 1.13 | 102 | |
| CRIV | III | 80 | II | 20 | w/o | 0 | w/o | 0 | ☐ | ☐ | ☐ | 28 | |
| CRV | III | 80 | II | 20 | w/o | 0 | w/o | 0 | 140 | 2.0 | ☐ | 30 | *1 |
| SRXIII | III | 80 | II | 20 | w/o | 0 | w/o | 0 | 140 | 2.0 | ☐ | 55 | *2 |

In table 1 the note *1 indicates that the thermal treatment was applied to pellets of the comparative thermoplastic resin V, and the note *2 indicates that the thermal treatment was applied to a mold of the sample thermoplastic resin XIII.

Table II shows particulars of the respective polypropylene resins, elastomers and additives.

|  | Manufacturer: Grade | Note |
|---|---|---|
| PP resin I | Chisso Co., Ltd.: Newcon NCK0005 | w/ elastomer |
| PP resin II | GRAND POLYMER Co., Ltd.: J106 | w/o elastomer |
| PP resin III | Chisso Co,. Ltd.: K1140 | w/ elastomer |
| Elastomer I | Shell Chemicals Japan Co., Ltd: KRATONG1730 | SEPS |
| Elastomer II | JSR Corporation: EP02P | EPR |
| Filler | Takehara Kagaku Kogyo Co., Ltd.; Talc Master Batch 4070T | talc |
| Additive | JAPAN POLYSTYRENE INC.: G120K | polystyrene |

Figure 3:
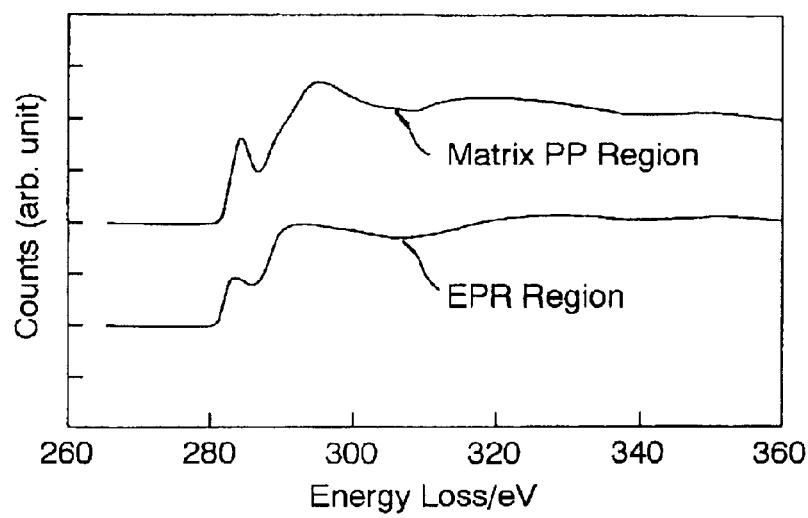
FIG. 3 is a diagrammatic view showing spectra representing bonded states of carbon of a molding made of a comparative thermoplastic resin composition in PP and EPR regions resulting from an electron energy loss spectroscopic (EELS) analysis.

The result of high speed elongation test is shown in FIG. 3.

While the respective sample and comparative thermoplastic resins are indicated as having the same elastomer contents in table I, the PP resins I and III were practically different in actual elastomer content from the others because their resin matrices contained elastomer components, respectively. The elastomers that were used in the respective sample and comparative thermoplastic resins included one that is of the styrene ethylene- polystyrene (SEPS) family (elastomer I) and an ethylene propylene rubber (EPR) (elastomer II). The additive that were used in the respective sample and comparative thermoplastic resins was a polystyrene (PS) resin that was incompatible with polypropylene but compatible with the elastomer components. The sample thermoplastic resins I–XI and the comparative thermoplastic resins I and II were principally of the three component type including an additive, and the sample thermoplastic resins XII and XIII and the comparative thermoplastic resins III and V were principally of the two component type not including any additive.

Figure 2:
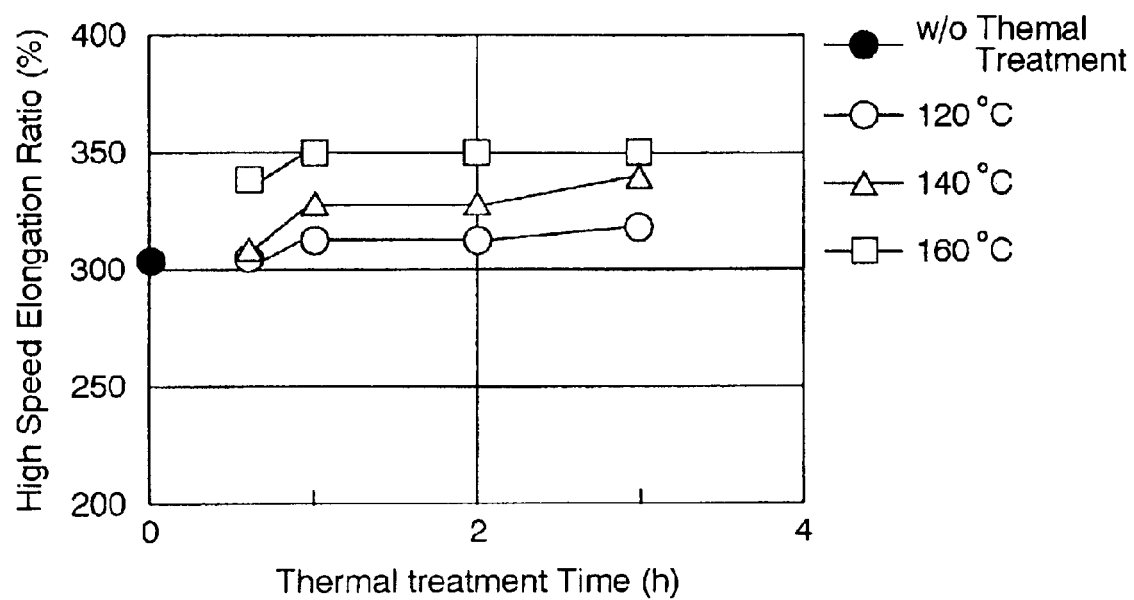
FIG. 2 is a graphical representation of a change in elongation percentage of a thermoplastic resin composition relative to a thermal treatment at different temperatures according to an embodiment of the present invention.

As demonstrated in table I and FIG. 2, it is revealed that, in the case where the thermoplastic resins are the same in compounding ratio, they are the same in the flexural coefficient of elasticity in spite of application of thermal treatment and are however improved in the property of high speed elongation due to thermal treatment. It is apparent that the property of high speed elongation is more enhanced with a raise in the temperature of thermal treatment. It is conceivably concluded that this results from that, as a result of the thermal treatment applied to a thermoplastic resin molding made of the thermoplastic resin containing a matrix polypropylene resin and an elastomer component that partly blends in with each other, the matrix polypropylene resin separates and precipitates in the elastomer component.

In order to maximize the effect of thermal treatment, the thermal treatment is necessary to continue for more than one hour. As apparent from a comparison between the test results of the comparative thermoplastic resins I and II, less than 30 minutes of the thermal treatment at low temperature below approximately 120° C. is too short for the polypropylene resin to bring out an upward improvement in the property of high speed elongation. In this instance, in light of the fact that both polypropylene resin and elastomer melt at a heating temperature between approximately 173° C. and approximately 176° C. in general, the temperature of thermal treatment was controlled under the melting temperature, more specifically under approximately 160° C.

As proved from FIG. 2, the thermal treatment is preferable to continue for more than two hours by reason of providing a stable upward improvement in the property of high speed elongation in a temperature region between 120° C. and 160° C. and, however, for less than eight hours by reason of preventing oxidation and/or decomposition of the thermoplastic resins.

With respect to thermoplastic resin moldings after the thermal treatment, it was ascertained in an analysis using electron energy loss spectroscopy (EELS) or in an examination with a transmission electron microscope (TEM) that the thermoplastic resin molding yielded a "sea-island-lake" micro-structure with a polypropylene resin component forming a "sea" region and it was undoubtedly easy to distinguish that the thermoplastic resin molding having such the "sea-island-lake" micro-structure gained the property of high speed elongation enhanced through the thermal treatment.

Figure 4:
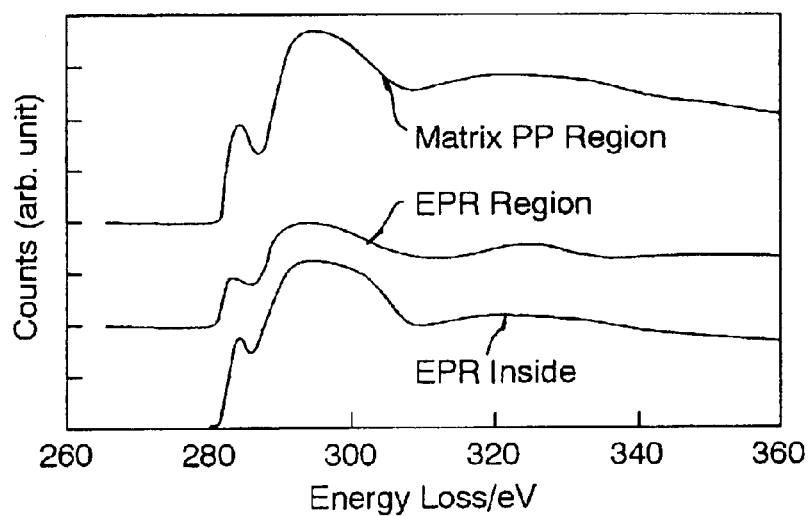
FIG. 4 is a diagrammatic view showing spectra representing bonded states of carbon of a thermoplastic resin composition in various parts of a "sea-island-lake" micro-structure according to an embodiment of the present invention in an electron energy loss spectroscopic (EELS) analysis.

FIG. 3 shows spectra representing bonded states of carbon of a molding made of the comparative thermoplastic resin III (which was not heat-treated) in PP and EPR regions based on from an electron energy loss spectroscopic (EELS) analysis. FIG. 4 shows spectra representing bonded states of carbon of a molding made of the sample thermoplastic resin XII (which is equivalent to the comparative thermoplastic resin III after a thermal treatment at 140° C. for two hours) at respective "sea-island-lake" micro-structures based on an electron energy loss spectroscopic (EELS) analysis. As clearly demonstrate in FIG. 4, the spectra representative of the bonded state of carbon in the "sea" region (matrix PP region) and the "lake" region (within EPR) of the "sea-island-lake" micro-structures of the sample thermoplastic resin XII are substantially identical in configuration. As opposed to this, as apparent in FIG. 3, there is no combination of spectra representing bonded states of carbon in the "sea" region (matrix PP region) and the "lake" region (EPR inside) of the "sea-island-lake" micro-structures of the comparative thermoplastic resin III that are substantially identical in configuration.

Figure 5:
FIG. 5 is a photomicrograph showing an image of a micro-structure of the molding made of a comparative thermoplastic resin composition taken at ×30000 magnification using a transmission electron microscope (TEM) that shows the micro-structure.
Figure 6:
FIG. 6 is a photomicrograph showing an image of a micro-structure of the molding made of the thermoplastic resin composition according to the embodiment of the present invention taken at ×100000 magnification using the transmission electron microscope (TEM) that shows the micro-structure.

FIG. 5 shows the "sea-island-lake" micro-structure of a molding made of the comparative thermoplastic resins III in TEM photograph at ×30000 magnification, and FIG. 6 shows the "sea-island-lake" micro-structure of a molding made of the sample thermoplastic resins XII in TEM photograph at ×100000 magnification. For the TEM observation of the "sea-island-lake" micro-structure, a fragmental specimen was cut off from the molding so that a region to be observed was located at a peripheral edge of the fragmental specimen. Thereafter, the fragmental specimen was trimmed by a cutter and then finished by deburring the periphery by a glass knife. Finally, the fragmental specimen was planed by a diamond knife and then dyed with a ruthenium tetroxide solution in steam dyeing or block dyeing. The TEM observation was made under an acceleration voltage of 300 kV.

As evidenced by the TEM photograph shown in FIG. 6, in the case of the sample thermoplastic resin XII, the "sea" region (that looks white or gray) and the "lake" region (that looks white or gray) hemmed in by the "island" region (that is EPR region looking black) are substantially identical in image contrast. As opposed to this, as evidenced by the TEM photograph shown in FIG. 5, in the case of the comparative thermoplastic resin III, there exist the matrix PP resin component (that looks white or gray) and the elastomer component (that looks white or gray) but almost no "lake" region within the elastomer component.

As described above, by continuously applying a thermal treatment at a temperature of 120° C. for longer than one hour to the thermoplastic resin molding made of a thermoplastic resin composition in which a thermoplastic polypropylene resin component and an elastomer component have partly blended in with each other, the polypropylene resin component is caused to separate in phase and precipitate in the elastomer component, so that the thermoplastic resin molding yields a greatly enhanced property of high speed elongation.

The thermoplastic resin composition and the molding made of the thermoplastic resin composition according to the present invention yields a greatly enhanced property of high speed elongation. In particular, the melioration of in the property of elongation can be realized in the case where the thermoplastic resin composition comprises a polypropylene resin that has a high versatility. That is, the thermoplastic resin molding yields a greatly enhanced property of elongation with neither encountering a decline in the coefficient of elasticity nor driving up manufacturing cost. Because the thermoplastic resin molding is meliorated in the property of elongation by thermal treatment, even if it is necessary to change the property of elongation of the thermoplastic resin molding and/or the thermoplastic resin composition for the thermoplastic resin molding after trial manufacture of the thermoplastic resin product, there is no necessity of modifying an molding die or fabricating an alternative molding die. This dispenses with an additional burden of molding costs and, in consequence, is very contributory to reduction in manufacturing costs of the thermoplastic resin moldings.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A thermoplastic resin composition having a sea-island-lake structure comprising:
    a matrix of a thermoplastic resin component as a sea; and
    a noncross-linked elastomer component forming islands as domains in said sea;
    wherein said thermoplastic resin component precipitates to form lakes as domains in said islands.

2. A thermoplastic resin composition as defined in claim 1, wherein said thermoplastic resin component comprises a polypropylene resin.

3. A thermoplastic resin composition as defined in claim 1, wherein, when providing a photomicrograph of said thermoplastic resin composition dyed with a ruthenium tetroxide solution by use of a transmission electron microscope, said photomicrograph shows substantially equal contrast between said "sea" and said "lake".

4. A thermoplastic resin composition as defined in claim 1, wherein, when analyzing said thermoplastic resin composition in spectroscopic analysis of electron energy loss said "sea" and said "lake" are substantially equal in spectral distribution pattern representing bonded states of carbon.

5. A thermoplastic resin composition as defined in claim 1, wherein said thermoplastic resin composition further comprises an additive component incompatible with said thermoplastic resin component and compatible with said elastomer component, said additive component forming lakes as domains in said islands.

6. A molding made of a thermoplastic resin composition having a sea-island-lake structure, said thermoplastic composition comprising a matrix of a thermoplastic resin component as a sea and a noncross-linked elastomer component forming islands as domains in said sea, wherein said thermoplastic resin component precipitates to form lakes as domains in said islands.

7. A molding as defined in claim 6, wherein said thermoplastic resin component comprises a polypropylene resin.

8. A molding as defined in claim 6, wherein, when providing a photomicrograph of said thermoplastic resin composition dyed with a ruthenium tetroxide solution by use of a transmission electron microscope, said photomicrograph shows substantially equal contrast between said "sea" and said "lake".

9. A molding as defined in claim 6, wherein, when analyzing said thermoplastic resin composition in spectroscopic analysis of electron energy loss, said "sea" and said "lake" are substantially equal in spectral distribution pattern representing bonded states of carbon.

10. A molding as defined in claim 6, wherein said thermoplastic resin composition further comprises an additive component incompatible with said thermoplastic resin component and compatible with said elastomer component, said additive component forming lakes as domains in said islands.

11. A process of manufacturing a molding from a thermoplastic resin composition having a sea-island-lake structure comprising a matrix of a thermoplastic resin component as a sea and a noncross-linked elastomer component forming islands as domains in said sea, wherein said thermoplastic resin component precipitates to form lakes as domains in said islands, said process comprising the step of continuously heating said molding at a heating temperature above approximately 120° C. but below a melting temperature of each of said thermoplastic resin component and said elastomer component for at least one hour so as thereby to cause said thermoplastic resin composition to separate and precipitate in said islands of said elastomer composition.

12. A process as defined in claim 11, wherein said thermoplastic resin composition further comprises an additive component incompatible with said thermoplastic resin component and compatible with said elastomer component and forms lakes as domains in said islands, and said heating temperature is above approximately 120° C. but below a melting temperature of each of said thermoplastic resin component, said elastomer component and said additive component.

13. A process as defined in claim 12, wherein said thermoplastic resin component, said elastomer component and said additive component comprise a polypropylene resin, a styrene elastomer and a polystyrene resin, respectively.

14. A process as defined in claim 11, wherein said thermoplastic resin component comprises a polypropylene resin.

15. A process as defined in claim 11, wherein, when providing a photomicrograph of said thermoplastic resin composition dyed with a ruthenium tetroxide solution by use of a transmission electron microscope, said photomicrograph shows substantially equal contrast between said "sea" and said "lake".

16. A process as defined in claim 11, wherein, when analyzing said thermoplastic resin composition in spectroscopic analysis of electron energy loss, said "sea" and said "lake" are substantially equal in spectral distribution pattern representing bonded states of carbon.

* * * * *